(12) United States Patent
Honme (10) Patent No.: US 7,362,339 B2
(45) Date of Patent: Apr. 22, 2008

(54) IMAGE PROCESSING METHOD AND APPARATUS

(75) Inventor: Mitsuhiro Honme, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 279 days.

(21) Appl. No.: 11/043,513

(22) Filed: Jan. 26, 2005

(65) Prior Publication Data
US 2005/0168475 A1 Aug. 4, 2005

(30) Foreign Application Priority Data
Jan. 29, 2004 (JP) ............................. 2004-020974

(51) Int. Cl.
*G09G 5/00* (2006.01)
(52) U.S. Cl. .................. 345/629; 345/634; 345/640
(58) Field of Classification Search ............ None
See application file for complete search history.

(56) References Cited

U.S. PATENT DOCUMENTS 5,831,635 A * 11/1998 Nakamura .................. 345/443
6,002,385 A * 12/1999 Silverbrook ................ 345/100
6,069,633 A * 5/2000 Apparao et al. ............ 345/421
2002/0149579 A1* 10/2002 Ozawa ...................... 345/419

FOREIGN PATENT DOCUMENTS

JP 10-187139 7/1998

* cited by examiner

*Primary Examiner*—Mark Zimmerman
*Assistant Examiner*—Kevin Xu
(74) *Attorney, Agent, or Firm*—Pillsbury Winthrop Shaw Pittman LLP (57) ABSTRACT

Image processing is performed on a plurality of layers including at least one line display layer or at least one sprite display layer, from which a plurality of attribute data regarding lines or sprites are sequentially read out so as to produce a plurality of display data, which are then written over each other in a buffer memory, so that the corresponding images are displayed on the screen of a display. With respect to overlapped regions at which plural lines or sprites overlap each other, plural display data are written over each other in the buffer memory in accordance with a first-in-first-out principle. In line processing, image data regarding different lines are subjected to alpha blending and are then written into the buffer memory. In sprite processing, image data regarding different sprites are subjected to rendering and alpha blending and are then written into the buffer memory.

10 Claims, 8 Drawing Sheets

| COLOR DATA | | | | | | | LINE DISPLAY LAYER WRITE BIT | | |
|---|---|---|---|---|---|---|---|---|---|
| D15 | D14 | D13 | ············ | D2 | D1 | D0 | L2 | L1 | L0 |

|  | WRITE COMPLETE | WRITE INCOMPLETE |
|---|---|---|
| FIRST LINE #0 | L[2:0]=1 | L[2:0]=0 |
| SECOND LINE #1 | L[2:0]=2 | L[2:0]≦1 |
| THIRD LINE #2 | L[2:0]=3 | L[2:0]≦2 |
| FOURTH LINE #3 | L[2:0]=4 | L[2:0]≦3 |
| FIFTH LINE #4 | L[2:0]=5 | L[2:0]≦4 |
| SIXTH LINE #5 | L[2:0]=6 | L[2:0]≦5 |

IMAGE PROCESSING METHOD AND APPARATUS

BACKGROUND OF THE INVENTION

1. Field of the Invention

This invention relates to image processing methods and apparatuses, in which images and objects are drawn and displayed on computer screens by use of blending and rendering techniques.

This application claims priority on Japanese Patent Application No. 2004-20974, the content of which is incorporated herein by reference.

2. Description of the Related Art

Conventionally, various image processing methods using attribute tables are frequently used for displaying images and objects on computer screens in television games and pachinko games (wherein 'pachinko' represents a Japanese style of pinball machines incorporating computer screens). Image processing apparatuses using attribute tables are designed in such a way that external CPUs write various attribute data such as sprite attribute data (representing identification numbers, display positions on screens, and magnification/reduction ratios) and line attribute data (representing colors, and coordinates of start points and end points in drawing lines on screens) into attribute tables. As to sprite attribute data read from an attribute table, for example, sprite patterns are read from a pattern memory in accordance with identification numbers and are used for drawing image data thereof in a display buffer in accordance with designated display positions and designated magnification/reduction ratios.

When a plurality of sprites and lines are displayed to be overlapped each other in accordance with attribute data on a computer screen, they are sequentially drawn in a display buffer in accordance with a prescribed priority order that is determined in advance, wherein a sprite to be drawn later is given a higher priority compared with a previously drawn sprite, so that in the area in which these sprites overlap each other, the sprite (or line) to be written later is written to overlap with the previously written sprite.

Japanese Patent Application Publication No. H10-187139 discloses an example of an image processing apparatus (specifically, a sprite display apparatus) in which sprites and lines are sequentially written over each other. Hence, in order to perform so-called alpha (α) blending between background image and 'grouped' sprites, which are subjected to grouping, alpha blending must be further performed on sprites, which have been already subjected to alpha blending, in the area in which sprites belonging to the same group overlap each other; therefore, it is very difficult to realize high-quality alpha blending. In short, the conventionally known apparatus is not designed to consider the situation where a plurality of sprites belonging to the same group overlap each other.

SUMMARY OF THE INVENTION

It is an object of the invention to provide an image processing method and an image processing apparatus, which realize alpha blending between sprites, lines, and other image data in a display buffer so as to improve image processing performance.

In a first aspect of the invention, an image processing method comprises a first step for sequentially reading a plurality of attribute data from a memory with regard to a plurality of layers that are displayed on the screen of a display; a second step for producing a plurality of display data based on plural attribute data, thus writing over plural display data sequentially in a buffer memory; and a third step for reading out plural display data from the buffer memory so as to display the corresponding images on the screen of the display. Herein, a plurality of sprites are designated by plural attribute data and are set to at least one of the layers, so that plural display data regarding plural sprites are written into the buffer memory in accordance with a first-in-first-out principle with respect to overlapped regions at which plural sprites overlap each other on the screen of the display.

In the above, a plurality of lines are designated by plural attribute data and are set to at least one of the layers, so that plural display data regarding plural lines are written into the buffer memory in accordance with a first-in-first-out principle with respect to overlapped regions at which plural lines overlap each other on the screen of the display. In addition, the attribute data designate storage positions regarding the lines in the memory. The attribute data further designate start-point coordinates, endpoint coordinates, colors, and widths of the lines.

In a second aspect of the invention, an image processing apparatus includes a memory for storing a plurality of attribute data with regard to a plurality of layers that are displayed on the screen of a display; a processing circuit for producing a plurality of display data based on plural attribute data, thus writing over plural display data sequentially in a buffer memory; and a display controller for reading out plural display data from the buffer memory so as to display the corresponding images on the screen of the display. Herein, a plurality of sprites are designated by plural attribute data and are set to at least one of the layers, so that plural display data regarding plural sprites are written into the buffer memory in accordance with a first-in-first-out principle with respect to overlapped regions at which plural sprites overlap on the screen of the display.

In the above, the processing circuit performs alpha blending using data regarding the layers stored in the memory and the display data stored in the buffer memory in accordance with alpha data, representing a prescribed ratio, included in the attribute data, so that alpha-blending completed data are written into the buffer memory. In addition, a plurality of lines are designated by plural attribute data and are set to at least one of the layers, so that plural display data regarding plural lines are written into the buffer memory in accordance with a first-in-first-out principle with respect to overlapped regions at which plural lines overlap each other on the screen of the display. Furthermore, the buffer memory has a plurality of memory slots for storing a plurality of line display layer write bits corresponding to plural lines with respect to a plurality of dots on the screen of the display, and the processing circuit determines whether to perform alpha blending on the display data in response to the line display layer write bits when the display data are written into the buffer memory.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

Figure 2:
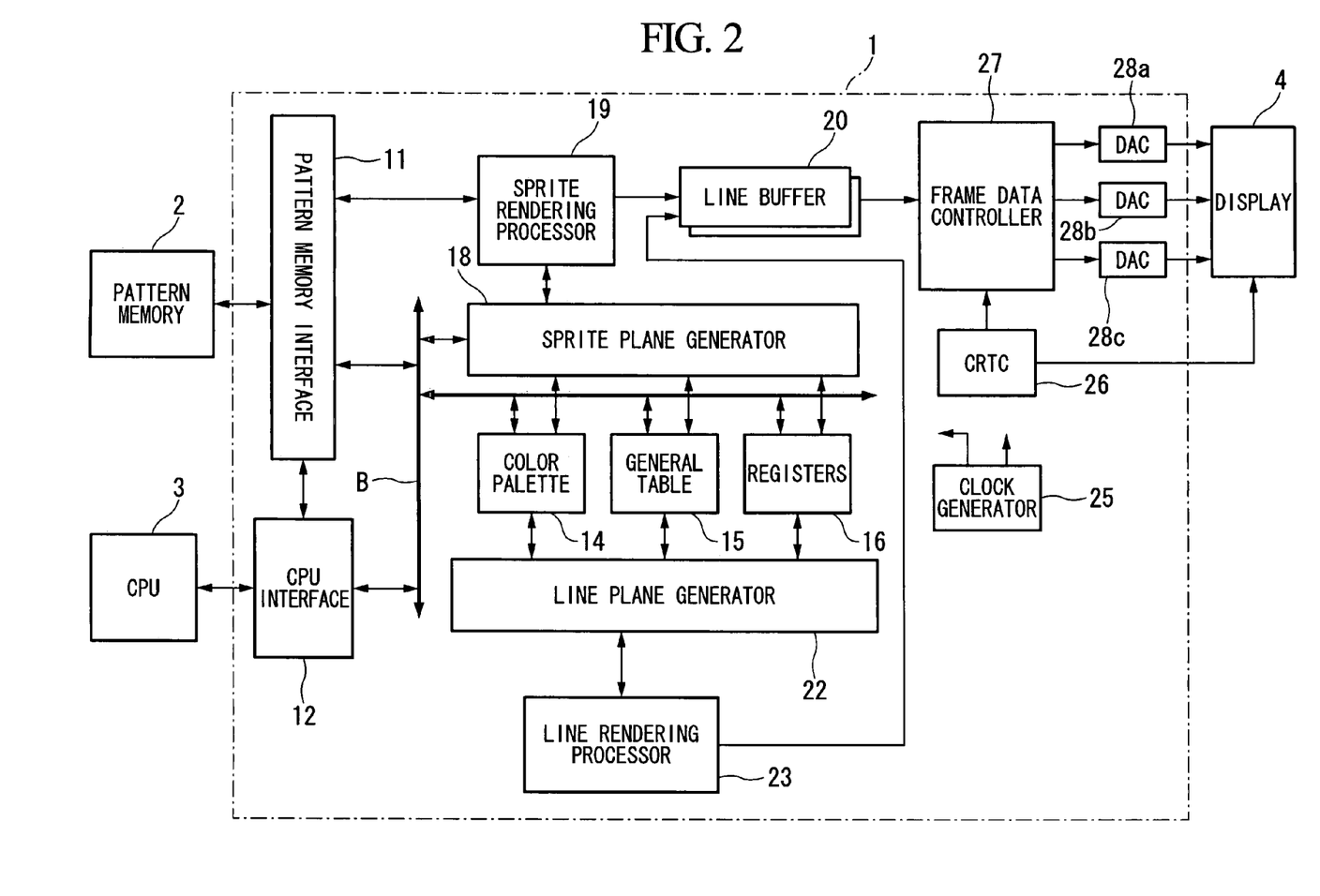
FIG. 2 is a block diagram showing an image display apparatus incorporating an image processing apparatus in accordance with a preferred embodiment of the invention.

FIG. 2 is a block diagram showing an image display apparatus incorporating an image processing apparatus 1 in accordance with a preferred embodiment of the invention, wherein reference numeral 2 designates a pattern memory for storing sprite patterns; reference numeral 3 designates a central processing device (i.e., a CPU) for controlling image display; and reference numeral 4 designates a CRT display (which can be replaced with a liquid crystal display with ease).

In the image processing apparatus 1, reference numeral 11 designates a pattern memory interface; reference numeral 12 designates a CPU interface; and reference symbol B designates a bus line. In addition, reference numeral 14 designates a color palette used for the conversion of color codes into RGB color data. Image data representing sprite patterns are stored in the pattern memory 2 by use of color codes, which can be converted into RGB color data in conjunction with the color palette 14. Reference numeral 15 designates a general table; and reference numeral 16 designate registers for temporarily storing various data. The CPU 3 performs writing operations on the general table 15, which includes a layer setup table 15a and a line attribute table 15b as shown in FIG. 3.

Figure 4:
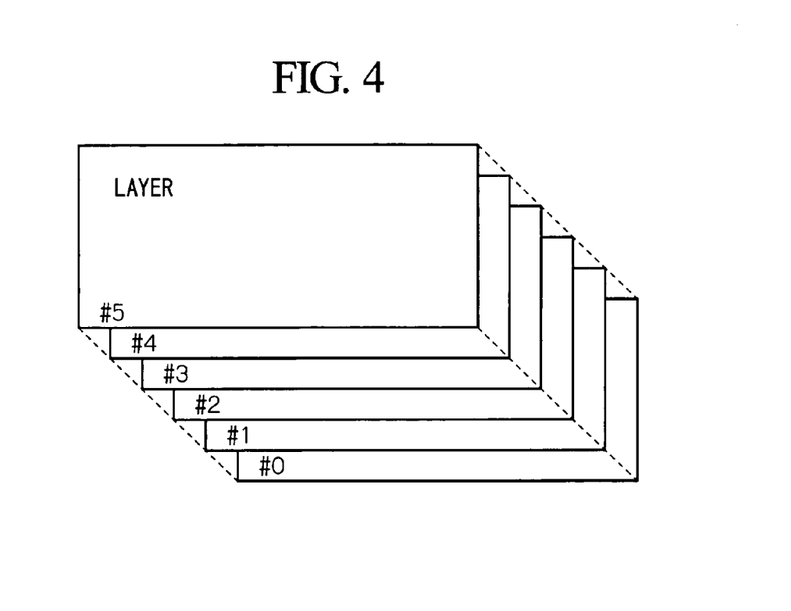
FIG. 4 diagrammatically shows the configuration of layers, which overlap each other.

The layer setup table 15a includes a plurality of layers. FIG. 4 diagrammatically shows the configuration of layers, wherein a layer #0 is firstly written; and then, subsequent layers #1, #2, . . . are sequentially written to overlap with the layer #0. Each of the layers corresponds to a sprite display layer or a line display layer, wherein the sprite display layer stores sprite attribute data, and the line display layer stores a start-point address, an endpoint address, and alpha ($\alpha$) data with respect to the line attribute table 15b. The sprite attribute data includes an identification number for identifying a sprite, display position data for designating a display position on a display screen, and alpha data designating alpha blending (where $0 \leq \alpha < 1$). The line attribute table 15b stores attributes of lines, e.g., start-point coordinates of lines, endpoint coordinates of lines, widths of lines, and colors of lines.

Figure 3:
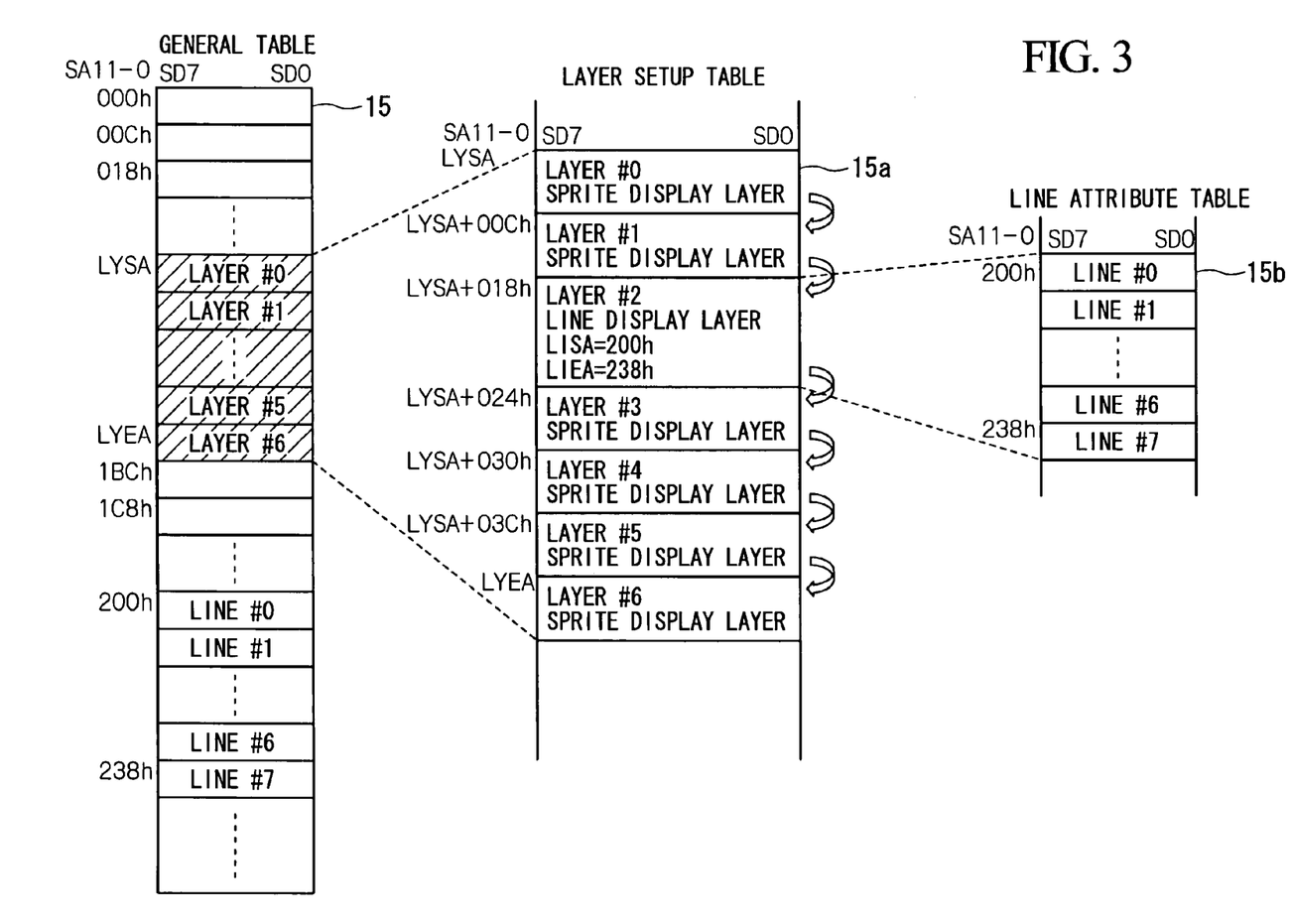
FIG. 3 diagrammatically shows contents of a general table shown in FIG. 2.

Specifically, as shown in FIG. 3, seven layers (namely, layers #0 to #6) are set to the layer setup table 15a, wherein the layer #2 corresponds to a line display layer, and other layers #0, #1, and #3 to #6 correspond to sprite display layers, each of which describes sprite attribute data with regard to a single sprite. The layer #2 describes a start address '200h', an end address '238h', and alpha data. Attributes of eight straight lines #0 to #7 are sequentially written into a storage area of the line attribute table 15b defined by the start address and end address.

In FIG. 2, a sprite plane generator 18 sequentially reads sprite attribute data from respective layers in the layer setup table 15a, so that identification numbers included in the read sprite attribute data are supplied to the pattern memory interface 11. The pattern memory interface 11 reads image data representing sprite patterns designated by the identification numbers from the pattern memory 2, so that the read image data are supplied to the sprite plane generator 18. The sprite plane generator 18 converts the image data into RGB color data in conjunction with the color palette 14, so that the RGB color data together with the sprite attribute data are supplied to a sprite rendering processor 19.

The sprite rendering processor 19 performs rendering processes such as magnification, reduction, and rotation of images on the RGB color data, which are output from the sprite plane generator 18, based on rendering data included in the sprite attribute data, so that processing results are written into a line buffer 20. When alpha data is included in sprite attribute data, alpha blending using a ratio designated by alpha data is performed between previous color data, which were already written in the line buffer 20, and present color data, which presently ought to be written into the line buffer 20, so that resultant color data are written into the line buffer 20.

A line plane generator 22 reads the start address, end address, and alpha data from the line display layer of the layer setup table 15a, so that line attribute data are read from the line attribute table 15b based on the read addresses. The line attribute data and alpha data are supplied to a line rendering processor 23, in which color codes representing colors of lines are converted into RGB color data in conjunction with the color palette 14.

The line rendering processor 23 calculates display positions of lines based on start-point coordinates, endpoint coordinates, and line widths included in the line attribute data, so that the color data included in the line attribute data are written into the line buffer 20 in accordance with the calculated display positions of lines. When the line rendering processor 23 receives the alpha data from the line plane generator 22, it performs alpha blending on present data and previous data, which were already written in the line buffer 20, so that resultant data are written into the line buffer 20. Details of the alpha blending will be described later.

The line buffer 20 is realized by a buffer memory having double buffers, which provide a plurality of memory slots respectively corresponding to dots on horizontal display lines of the display 4. Herein, double buffers alternately serve as a write buffer and a read buffer. A clock generator 25 generates reference clock pulses, which are supplied to various circuits and blocks in the image processing apparatus 1. Based on reference clock pulses output from the clock generator 25, a CRT controller (CRTC) 26 generates various pulse signals for driving the display, such as horizontal scanning pulses and vertical scanning pulses, which are supplied to the display 4 and a frame data controller 27 respectively. The frame data controller 27 reads color data from the line buffer 20 so as to output them to digital-to-analog converters (DACs) 28a, 28b, and 28c in accordance with horizontal scanning pulses. The DACs 28a to 28c convert color data into analog color signals, which are then supplied to the display 4.

Next, the overall operation of the image processing apparatus 1 will be described under the precondition that the CPU 3 completes writing data into the layer setup table 15a and the line attribute table 15b as shown in FIG. 3.

When the CPU 3 completes writing data into the layer setup table 15a and the line attribute table 15b, the sprite plane generator 18 reads sprite attribute data from the layer #0 of the layer setup table 15a, whereby image data of the corresponding sprite pattern are read from the pattern memory 2 based on the sprite attribute data and are then converted into RGB data in conjunction with the color palette 14, so that the RGB data together with the sprite attribute data are supplied to the sprite rendering processor 19. The sprite rendering processor 19 performs rendering on the RGB data, so that resultant data are written into the line buffer 20. Next, the sprite plane generator 18 reads sprite attribute data from the layer #1 of the layer setup table 15a, whereby RGB data are produced by the aforementioned processes and are then supplied to the sprite rendering processor 19, which in turn performs rendering so that resultant data are written into the line buffer 20. When alpha data are included in the sprite attribute data, alpha blending is performed on present data and previous data, so that resultant data are written into the line buffer 20.

Next, the line plane generator 22 reads the start address and end address from the layer #2 of the layer setup table 15a, whereby line attribute data regarding eight lines #0 to #7 are read from the line attribute table 15b based on the start address and end address and are then supplied to the line rendering processor 23. The line rendering processor 23 firstly calculates image data for the line #0 based on the line attribute data of the line #0, so that the calculated image data are written into the line buffer 20. Next, it calculates image data for the line #1 based on the line attribute data of the line #1, so that the calculated image data are written into the line buffer 20. With respect to dots at which the lines #0 and #1 overlap each other, image data of the previously written line is given a priority and is not overwritten by other image data.

Similarly, image data are sequentially calculated with respect to the other lines #2 to #7 and are then written into the line buffer 20.

Next, the sprite plane generator 18 reads sprite attribute data of the layer #3 from the layer setup table 15a, whereby RGB color data corresponding to the read sprite attribute data are subjected to rendering in the sprite rendering processor 19, so that rendering results are written into the line buffer 20. Similar processing is repeatedly performed on other sprite attribute data regarding the layers #4 to #6. After completion of the processing, the resultant data are sequentially written over on the order of the layers #0 to #6 in the line buffer 20, so that they are read out and supplied to the frame data controller 27, via which they are supplied to the display 4 via the DACs 28a to 28c. Thus, it is possible to display images including sprites and lines, based on the contents of the layers #0 to #6 that overlap each other, on the screen of the display 4.

Next, line writing processes executed in the line rendering processor 23 will be described in detail.

Figure 1:
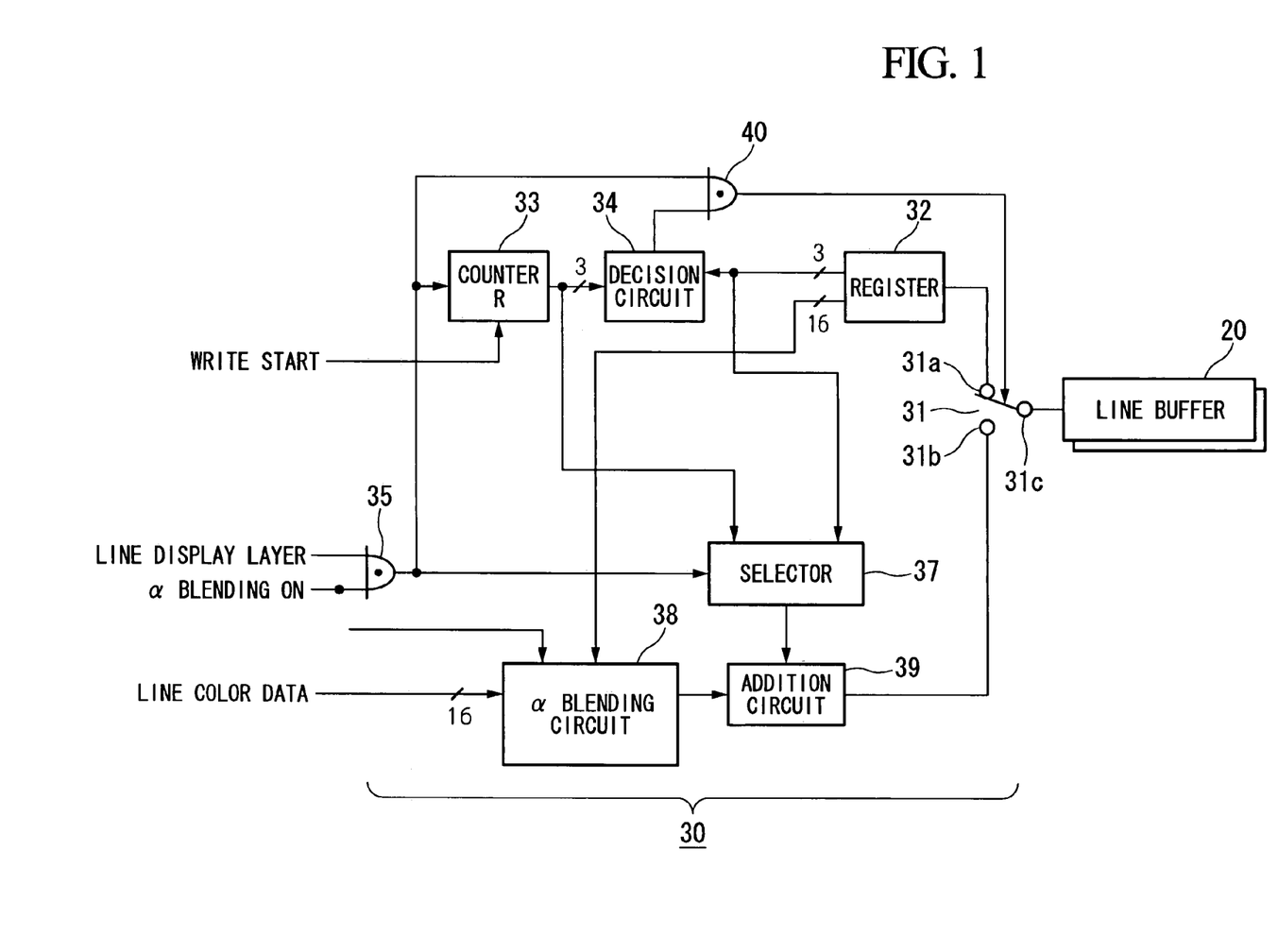
FIG. 1 is a block diagram showing the internal constitution of a line processing circuit connected with a line processor shown in FIG. 2.
Figure 5:
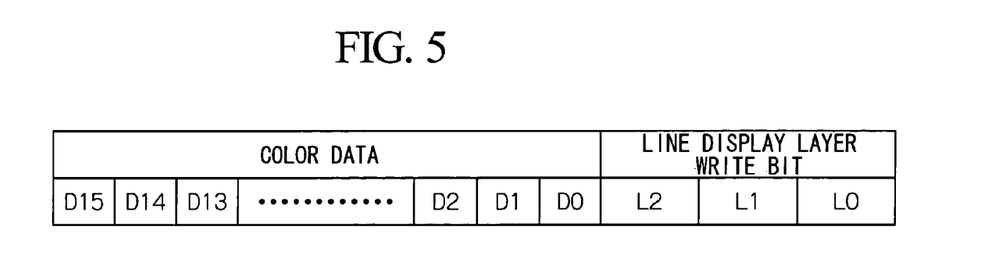
FIG. 5 shows a data format that is written in the line buffer in correspondence with one dot of the screen of a display shown in FIG. 2.

FIG. 1 is a block diagram showing the internal constitution of a line processing circuit 30 that is incorporated in the line rendering processor 23 and is connected with the line buffer 20; and FIG. 5 shows the data format that is written in the line buffer 20 in correspondence with one dot of the screen of the display 4. This data format describes color data of sixteen bits (D0 to D15), and three line display layer write bits (L0 to L2), which are used only for displaying lines.

In the line processing circuit 30 shown in FIG. 1, reference numeral 31 designates a switch; and reference numeral 32 designates a register for writing color data of sixteen bits and three line display layer write bits. Reference numeral 33 designates a counter; and reference numeral 34 designates a decision circuit. The counter 33 is reset when starting a write operation on a subject scan line, wherein it is incremented in count value by '1' at the timing of starting a line display layer write operation in which an AND gate 35 produces '1', in other words, at the timing when alpha data whose value is other than zero is set to the corresponding line display layer. The decision circuit 34 compares the count value of the counter 33 with the value designated by line display layer write bits stored in the register 32, wherein it outputs '0' when the count value is greater than the designated value, while it outputs '1' when the count value is equal to the designated value.

The output of the decision circuit 34 is supplied to an AND gate 40, which in turn performs an AND operation on the output of the decision circuit 34 and the output of the AND gate 35, thus controlling the switch 31 having a movable contact, two fixed contacts 31a and 31b, and a common terminal 31c. That is, when the AND gate 40 produces '1', the movable contact is connected with the fixed contact 31a so as to establish a connection between the register 32 and the line buffer 20 via the switch 31. When the AND gate 40 produces '0', the movable contact is connected with the fixed contact 31b so as to establish a connection between an addition circuit 39 and the line buffer 20 via the switch 31.

A selector 37 selects the count value of the counter 33 when the AND gate 35 produces '1', while it selects the value designated by line display layer write bits written in the register 32 when the AND gate 35 produces '0'. Reference numeral 38 designates an alpha ($\alpha$) blending circuit that performs alpha blending when an alpha blending mode is ON, in other words, when alpha data is other than zero. That is, the prescribed alpha blending is performed using color data (e.g., D1) written in the register 32 and line color data (e.g., D2) in accordance with the following formula, thus producing alpha-blending completed data (e.g., D3), which is then supplied to the addition circuit 39.

$$D1 \times \alpha + D2 \times (1-\alpha) = D3$$

In the addition circuit 39, the output of the selector 37 is added to the alpha-blending completed data so as to produce 19-bit data, which are written into the line buffer 20 via the switch 31.

Next, the overall operation of the line processing circuit 30 will be described with reference to FIG. 3. When no alpha data is set to the layer #2 (where α=0), line data of lines #0 to #7 set to the line attribute table 15b are sequentially written into the line buffer 20 by way of the alpha blending circuit 38, addition circuit 39, and switch 31. In this case, all the line data are written over sequentially in the line buffer 20, wherein the last written line is given a higher priority compared with the previously written line.

When alpha data is set to the layer #2 (where α≠0), before a write operation regarding line color data of the line #0, the line rendering processor 23 reads color data and line display layer write bits from a designated memory slot of the line buffer 20 so as to write them into the register 32. In FIG. 3, no line display layer exists above the layer #2, so that the binary notation regarding three line display layer write bits can be originally expressed as '000'. At this time, the count value of the counter 33 is expressed as '001'. Thus, the decision circuit 33 produces '0' as the decision result thereof, so that the AND gate 40 correspondingly produces '0', so that the movable contact is connected with the fixed contact 31b in the switch 31. In addition, the AND gate 35 produces '1' so that the selector 37 selects the count value of the counter 33 (i.e., '001'), which is supplied to the addition circuit 39.

As a result, the alpha blending circuit 38 performs alpha blending using line color data of the line #0, which should be subjected to writing, and color data stored in the register 32, thus producing alpha-blending completed data, which are then added to the output of the selector 37 (i.e., '001'). Then, the addition result is written into the line buffer 20 via the switch 31.

Figure 6:
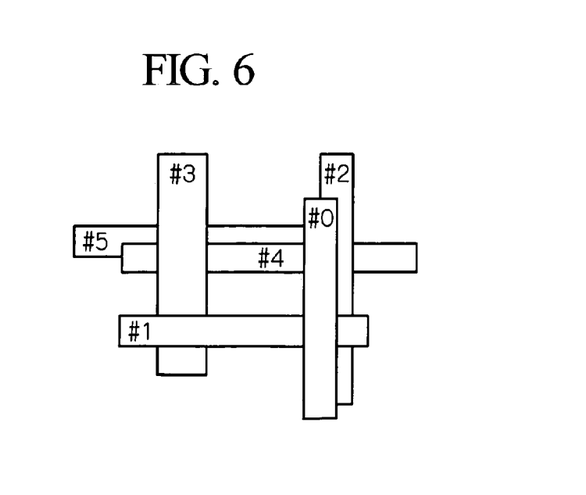
FIG. 6 shows a display manner in which six lines are displayed while partially overlapping each other.
Figure 7:
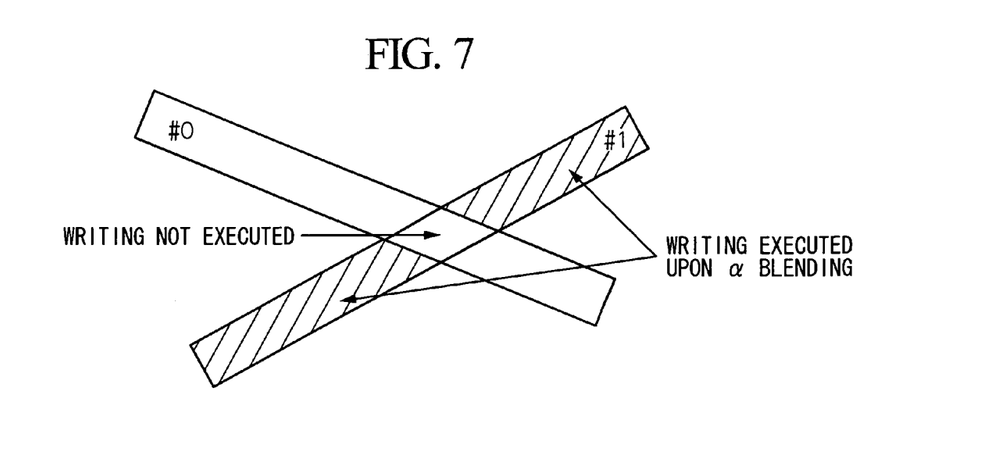
FIG. 7 shows two lines that cross or partially overlap so as to control writing using alpha blending.

Next, a writing operation is performed on line color data of the line #1 (see FIGS. 6 and 7). As shown in FIG. 7, alpha-blending completed data are written with respect to dots that lie in regions of the line #1 other than a crossing region between the lines #0 and #1. With respect to the crossing region between the lines #0 and #1, the binary notation of three line display layer write bits stored in the register 32 is expressed as '001' so that the decision circuit 40 produces '1', and the AND gate 40 correspondingly produces '1', whereby the movable contact is connected with the fixed contact 31a in the switch 31. Thus, color data of the register 32 and the line display layer write bits are written into the line buffer 20 via the switch 31. That is, the so called "first-in-first-out" principle works so as to block line color data of the line #0 from being written into the line buffer 20.

Next, line color data of the line #2 are subjected to writing, wherein as similar to the line #0, alpha-blending completed data are written with respect to regions of the line #2 other than the crossing region between the lines #2 and #0 and the crossing region between the lines #2 and #1. With respect to the crossing regions, the decision circuit 34 produces '1' as the decision result thereof, so that the line color data of the line #2 are replaced with the data of the register 32, which are thus written into the line buffer 20. Similar processes are performed with respect to other lines #3 to #7, which are thus adequately subjected to writing.

Next, a description will be given with respect to a modified example in which the layer #4 is set to a line display layer having alpha data whose value is not zero in the layer setup table 15a, whereby the layers #2 and #4 are both set to line display layers, while other layers #0, #1, #3, #5 to #7 are all set to sprite display layers. In writing of the layer #4, the count value of the counter 33 is set to '010'. In both of the first case where the line #0 of the layer #4 subjected to writing does not cross or partially overlap with all lines of the layer #2 and the second case where it crosses or partially overlap with any of the lines of the layer #2, the binary notation of the line display layer write bits stored in the register 32 is '000' or '001', so that the decision circuit 34 produces '0'. Thus, the addition circuit 39 adds alpha-blending completed data and the count value of the counter 33 (i.e., '010') corresponding to the line display layer write bits, so that the addition result is written into the line buffer 20 via the switch 31.

When the line color data subjected to writing overlap with the write-completed lines of the layer #4, the binary notation of the line display layer write bits stored in the register 32 is '010' so that the decision circuit 34 produces '1', whereby the data of the register 32 are written into the line buffer 20 via the switch 31.

Figure 8:
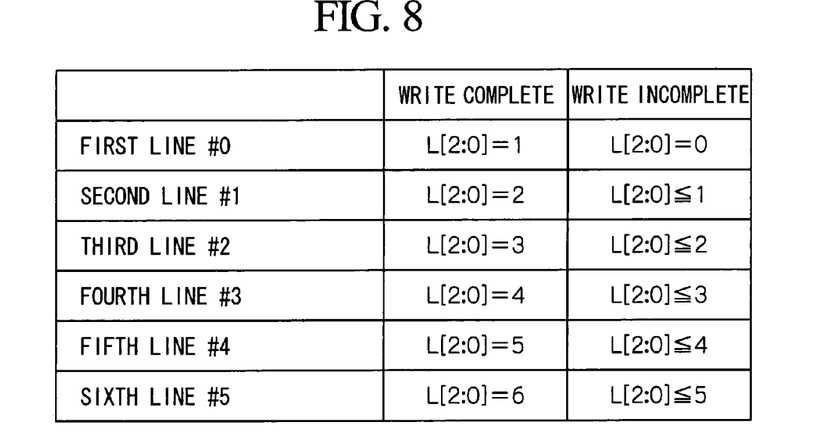
FIG. 8 shows relationships between various values regarding the decimal notation of line display layer write bits denoted as L[2:0] in relation to six lines crossing or partially overlapping in display.

FIG. 8 shows relationships between various values regarding the decimal notation of line display layer write bits, which is denoted as "L[2:0]", in relation to six lines #0 to #5 subjected to writing, which cross or partially overlap each other, wherein these values are determined with regard to a write completion state (in which overwriting is not performed with regard to the data of the register 32 so that the original data is maintained) and a write incompletion state (in which writing proceeds with regard to alpha-blending completed data). The decision circuit 34 makes decisions as to whether or not line color data have been already written with regard to prescribed dots in prescribed lines of the same layer with reference to the aforementioned relationships shown in FIG. 8.

Figure 9:
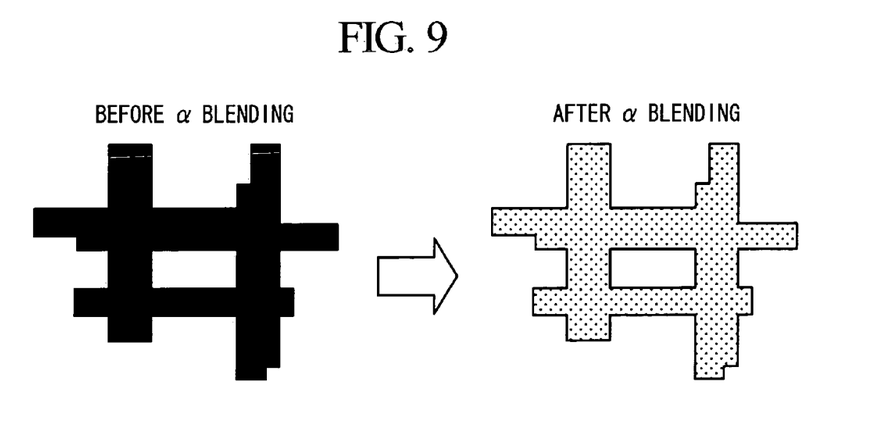
FIG. 9 shows a plurality of lines that overlap each other and that are drawn using alpha blending.

According to the present embodiment, a plurality of lines are allocated to the same layer, so that alpha blending is performed in units of layers respectively. Thus, as shown in FIG. 9, it is possible to execute alpha blending using write-completed data, which have been already written in the line buffer 20, with respect to a specific figure that is created by drawing a plurality of lines partially overlapping each other.

In addition, the present embodiment demonstrates the following effect in antialiasing.

Figure 10A:
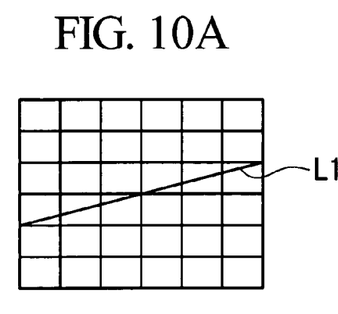
FIG. 10A shows a straight line that is drawn in a slanted manner to define a boundary on the square matrix of dots.
Figure 10B:
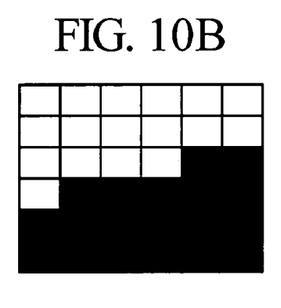
FIG. 10B shows on/off controls of display along the boundary without using antialiasing.
Figure 10C:
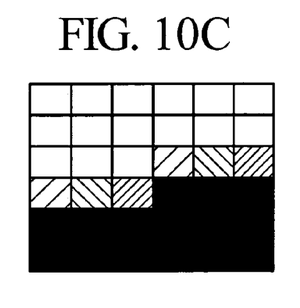
FIG. 10C shows on/off controls of display along the boundary by use of antialiasing.

Antialiasing is a technique for eliminating the stairstep appearance of lines and curves (or notches in boundaries of lines and curves) in image processing. Suppose that as shown in FIG. 10, a straight line L1 is drawn in a slanted manner to define a boundary in the square matrix of dots. When antialiasing is not executed, dots that are each partitioned by the line L1 are subjected to on/off controls in display in such a way that prescribed dots whose lower areas are each equal to or above the half of the 'square' dot area are turned on in display, but the other dots whose lower areas are each less than the square dot area are turned off in display. This produces an image of FIG. 10B in which dark blocks correspond to dots that are each turned on in display and which forms notches on the boundary. When antialiasing is executed, alpha blending of sixteen stages is adequately performed in response to ratios of lower areas of dots on the boundary compared with the square dot area. This produces an image of FIG. 10C in which notches are adequately eliminated on the boundary.

Figure 11A:
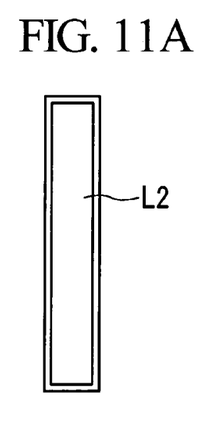
FIG. 11A shows a straight line completed in antialiasing.
Figure 11B:
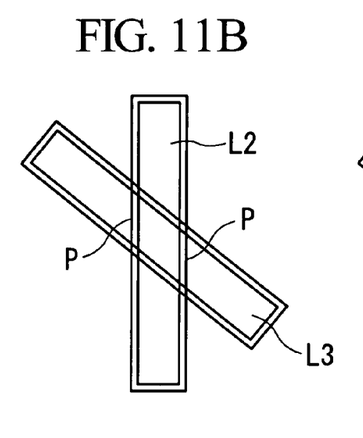
FIG. 11B shows two straight lines crossing each other under effects of antialiasing.
Figure 11C:
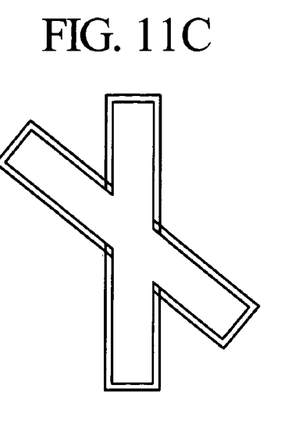
FIG. 11C shows two straight lines crossing each other under effects of antialiasing and alpha blending.

In the conventionally know display apparatus in which a single straight line is assigned to a single layer, when a straight line L3 presently subjected to antialiasing is drawn to cross another straight line L2 completed in antialiasing (see FIG. 11A) as shown in FIG. 11B, crossing regions P between these lines L2 and L3 must be changed in color. According to the present embodiment, dots belonging to antialiasing regions (i.e., alpha-blending completed regions) of the line L2 are handled as write-impletion dots, so that as shown in FIG. 11C, they are written over by corresponding dots of the line L3; hence, it is possible to solve the aforementioned problem.

The present embodiment is designed in such a way that a plurality of lines are assigned to one layer, but a single sprite is assigned to one layer. Of course, it is possible to modify the present embodiment such that a plurality of sprites are assigned to one layer, which will be described below.

Figure 13:
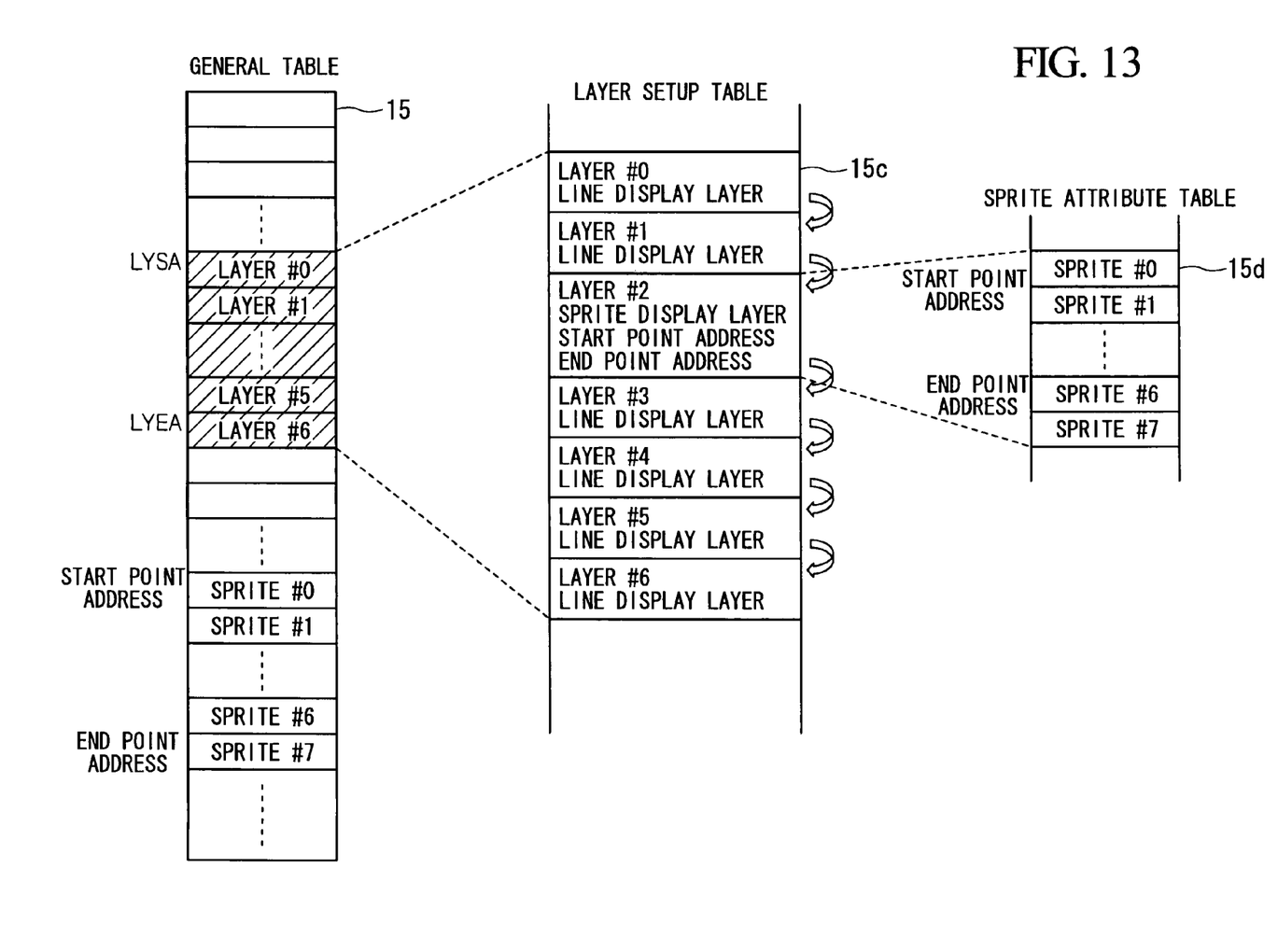
FIG. 13 shows a modified example of the contents of the general table shown in FIG. 2, which stores a layer setup table having a plurality of layers including a single sprite display layer whose content is expanded in a sprite attribute table.

The general table 15 stores a layer setup table 15c and a sprite attribute table 15d as shown in FIG. 13, wherein a plurality of layers (i.e., layers #0 to #6) including a single sprite display layer (#2) are set to the layer setup table 15c. The sprite display layer #2 describes a start address and an end address for defining the memory area for storing the sprite attribute table 15d as well as alpha data (where $0 \leq \alpha \leq 01$), wherein the sprite attribute table 15d stores eight sprites #0 to #7 as well as sprite attribute data regarding sprites subjected to writing. As described above, the sprite attribute data are rendering data for designating identification numbers, display positions, and magnification/reduction ratios with respect to sprites. Of course, the layer setup table 15c can be modified to include a plurality of sprite display layers. The other layers #0, #1, and #3 to #6 describe line attribute data such as start-point addresses of lines, endpoint addresses of lines, widths of lines, colors of lines, and alpha data designating alpha blending.

In FIG. 2, the sprite plane generator 18 sequentially reads a plurality of sprite attribute data regarding a plurality of sprites described in the sprite display layer #2 from the general table 15, wherein with respect to each of the sprites, the identification number included in the sprite attribute data is sent to the pattern memory interface 11, which in turn reads image data of a sprite pattern designated by the identification number from the pattern memory 2, so that the read image data are supplied to the sprite plane generator 18. The sprite plane generator 18 converts the image data of the sprite pattern into RGB color data in conjunction with the color palette 14, so that the RGB color data together with the sprite attribute data are supplied to the sprite rendering processor 19. Thus, the sprite rendering processor 19 performs rendering (representing magnification, reduction, and rotation of an image) on the RGB color data based on the rendering data included in the sprite attribute data.

In this modification, the sprite rendering processor 19 has a sprite processing circuit whose circuit configuration is substantially identical to the circuit configuration of the line processing circuit 30 shown in FIG. 1. Compared with the line processing circuit 30, the sprite processing circuit (not shown) is designed such that the write start timing of the sprite display layer having alpha data whose value is not equal to zero is adapted to the AND gate 35, and the alpha blending circuit 38 performs alpha blending using color data stored in the register 32 and sprite color data in accordance with the alpha data. Substantially the same format of line image data is used for sprite image data stored in the line buffer 20; that is, sprite image data include 16-bit color data and three sprite display layer write bits.

Next, the overall operation of the sprite processing circuit will be briefly described with reference to FIG. 1.

Similar to the line processing circuit 30, the sprite processing circuit performs alpha blending on sprites with respect to prescribed dots subjected to writing, or it directly writes original color data and sprite display layer write bits, which have been already written in the register 32, into line buffer 20 in accordance with the first-in-first-out principle without performing alpha blending.

In order to realize a sprite to be displayed, three sprite display layer write bits and 16-bit color data, which are written in the line buffer 20 with respect to prescribed dots designated by display positions included in sprite attribute data, are supplied to the register 32. Similar to the line display processing executed by the line processing circuit 30, the counter 33 is reset at the start timing of writing subject scan lines, so that the count value thereof is incremented by '1' when the AND gate 35 outputs '1' at the start timing of writing the corresponding sprite display layer, to which alpha data not equal to zero is set. The decision circuit 34 compares the count value of the counter 33 with the value designated by the sprite display layer write bits output from the register 32.

When the decision circuit 34 determines that the count value of the counter 33 is smaller than the value designated by the sprite display layer write bits output from the register 32, the alpha blending circuit 38 performs alpha blending on the rendering-completed color data and the color data read from the line buffer 20 in accordance with alpha data included in sprite attribute data.

When the decision circuit 34 determines that the count value is equal to the designated value, it is determined that a sprite corresponding to the color data read from the line buffer 20 has been already subjected to writing in accordance with the other sprite attribute data described in the sprite display layer (i.e., layer #2 shown in FIG. 13), so that the color data of the line buffer 20 regarding prescribed dots are not subjected to alpha blending using the rendering-completed color data and are directly written into the line buffer 20 together with the sprite display layer write bits. In short, this modification operates in accordance with the first-in-first-out principle so that the RGB color data completed in rendering are not written into the line buffer 20. Similar to the line display processing executed by the line processing circuit 30, the sprite processing circuit selectively performs either the alpha blending or the direct writing operation with respect to the line buffer 20; hence, the details thereof will be omitted. Thus, even though a plurality of sprites are assigned to the same layer, it is possible to realize alpha blending in each layer.

Figure 12:
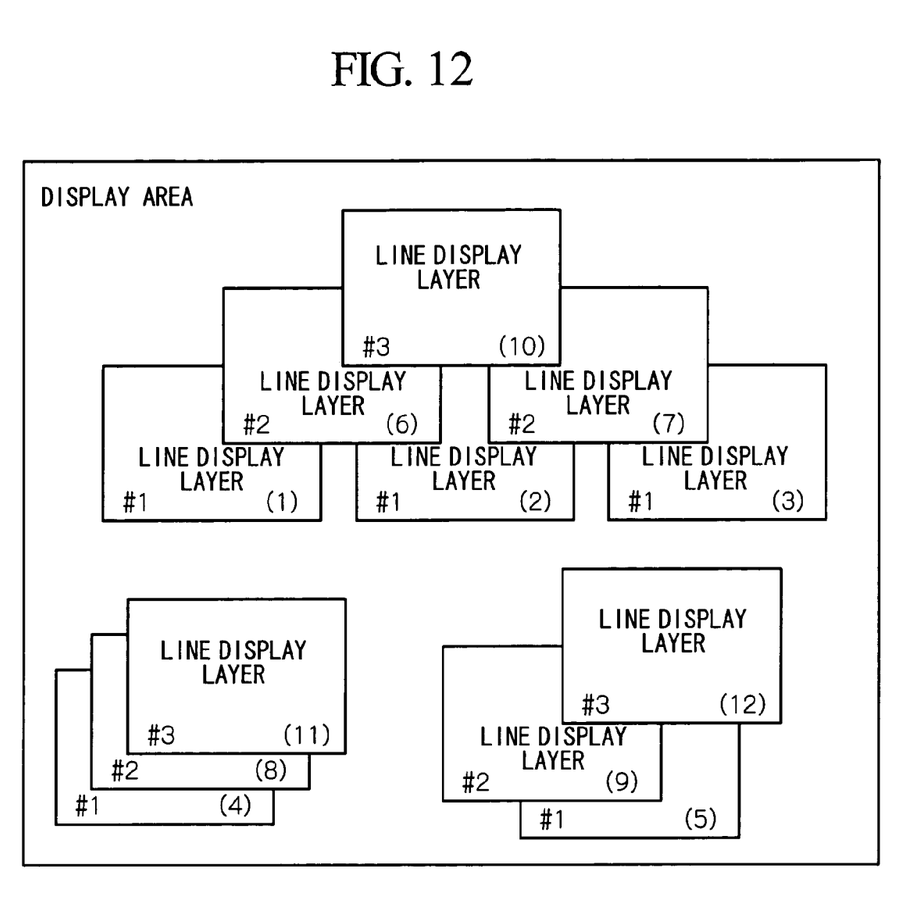
FIG. 12 shows a display manner in which each of the line display layers is reduced in size compared with the overall area of the screen of the display.

In the present embodiment described above, each layer may be designed to have substantially the same size of the screen of the display 4; however, it is possible to re-design each layer to have a reduced size compared with the screen size of the display 4. Such display control regarding sizes of layers displayed on the screen of the display 4 can be adequately realized by introducing specific parameters (e.g., line display layer numbers) independently of layer numbers as attributes regarding line display layers. Specifically, in FIG. 12, reference numerals #1, #2, and #3 designate layer numbers, and reference numerals in parenthesis such as (1), (2), . . . designate line display layer numbers. When a plurality of line display layers do not overlap each other, it is possible to increase the total number of line display layers to be displayed on the screen of the display 4. FIG. 12 shows an example in which each line display layer has two line display layer write bits, wherein it is possible to realize twelve layers being overlapped each other on the screen of the display 4, whereas the present embodiment may be capable of realizing only three layers being overlapped each other on the screen of the display 4.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An image processing method comprising the steps of:
   storing a layer that describes plural sets of attribute data for defining a plurality of images to be displayed on a screen of a display device and alpha data indicative of one blending value;
   generating a plurality of display data in accordance with the layer describing the plural sets of attribute data in a predetermined order;
   receiving each of the plurality of display data generated by the generating step;
   if the receiving step receives display data that has been generated in accordance with a first order of a set of attribute data from among the plural sets of attribute data described in the layer, performing alpha-blending on the received display data and color data, corresponding to regions of the received display data and stored in a buffer memory, on the basis of the alpha data, so as to generate blended color data, and writing the blended color data into the buffer memory;
   if the receiving step receives display data that has been generated in accordance with a second or greater order of a set of attribute data from among the plural sets of attribute data described in the layer, performing alpha-blending on the received display data and color data, corresponding to non-overlapping regions that have not been written yet by any of the plurality of display data generated in accordance with the layer from among regions of the received display data and stored in the buffer memory, on the basis of the alpha data, so as to generate blended color data while inhibiting the performing of alpha-blending on the received display data and color data, corresponding to overlapping regions that have been written by any of the plurality of display data generated in accordance with the layer from among regions of the received display data and stored in the buffer memory, and writing the blended color data into the buffer memory;
   reading out the blended color data from the buffer memory; and
   outputting the read-out blended color data to the display device for displaying images in accordance with the read-out blended color data on the screen of the display device.

2. The image processing method according to claim 1, wherein the plurality of images, which are defined based on the plural sets of attribute data described in the layer, designate a line.

3. The imaging processing method according to claim 1, wherein the plurality of images, which are defined based on the plural sets of attribute data described in the layer, design a sprite.

4. The image processing method according to claim 2, wherein each of the plurality sets of attribute data includes start-point coordinates of the line, end-point coordinates of the line, a width of the line, and a color of the line.

5. The image processing method according to claim 3, wherein each of the plural sets of attribute data includes identification data for identifying the sprite and display position data for designating a display position of the sprite on the screen.

6. An image processing apparatus comprising:
   a storing section for storing a layer that describes plural sets of attribute data for defining a plurality of images to be displayed on a screen of a display device and alpha data indicative of one blending value;
   a plane generator for generating a plurality of display data in accordance with the layer describing the plural sets of attribute data in a predetermined order;
   a buffer memory having a plurality of memory slots corresponding to dots for storing color therein;
   a rendering processor for receiving each of the plurality of display data from the plane generator,
   wherein if the rendering processor receives display data that has been generated in accordance with a first order of a set of attribute data from among the plural sets of attribute data described in the layer, the rendering processor performs alpha-blending on the received display data and color data, corresponding to regions of the received display data and stored in the buffer memory, on the basis of the alpha data, so as to generate blended color data, and writes the blended color data into the buffer memory;
   wherein if the rendering processor receives display data that has been generated in accordance with a second or greater order of a set of attribute data from among the plural sets of attribute data described in the layer, the rendering processor performs alpha-blending on the received display data and color data, corresponding to non-overlapping regions that have not been written yet by any of the plurality of display data generated in accordance with the layer from among regions of the received display data and stored in the buffer memory, on the basis of the alpha data, so as to generate blended color data while inhibiting the performing of alpha-blending on the received display data and color data, corresponding to overlapping regions that have been written by any of the plurality of display data generated in accordance with the layer from among regions of the received display data and stored in the buffer memory, and writes the blended color data into the buffer memory; and
   a controller for reading out the blended color data from the buffer memory and outputting the read-out blended color data to the display device for displaying images in accordance with the read-out blended color data on the screen of the display device.

7. The image processing apparatus according to claim 6, wherein the plurality of images, which are defined based on the plural sets of attribute data described in the layer, designate a line.

8. The image processing apparatus according to claim 6, wherein the plurality of images, which are defined based on the plural sets of attribute data described in the layer, designate a sprite.

9. An imaging processing apparatus according to claim 7, wherein each of the plural sets of attribute data includes start-point coordinates of the line, end-point coordinates of the line, a width of the line, and a color of the line.

10. An imaging processing apparatus according to claim 8, wherein each of the plural sets of attributes data includes identification data for identifying the sprite and display portion data for designating a display position of the sprite on the screen.

* * * * *